L. C. BROWN.
COOKING UTENSIL.
APPLICATION FILED AUG. 30, 1916.

1,245,670.

Patented Nov. 6, 1917.

Inventor
LEWIS C. BROWN
H. S. Field
Attorney

UNITED STATES PATENT OFFICE.

LEWIS C. BROWN, OF DUBOISTOWN, PENNSYLVANIA.

COOKING UTENSIL.

1,245,670.  Specification of Letters Patent.  Patented Nov. 6, 1917.

Application filed August 30, 1916. Serial No. 117,796.

*To all whom it may concern:*

Be it known that I, LEWIS C. BROWN, a citizen of the United States, residing at Duboistown, in the county of Lycoming, State of Pennsylvania, have invented a new and useful Cooking Utensil; and I do hereby declare the following to be a full, clear, and exact description of the invention, such as will enable others skilled in the art to which it appertains to make and use the same.

The present invention relates to certain new and useful improvements in cooking utensils, and has for its object to provide a kettle which embodies novel features of construction whereby it is impossible to burn or scorch any food being cooked therein.

Further objects of the invention are to provide a cooking kettle of this character which is simple and inexpensive in its construction, which can be easily assembled, which can be readily cleaned and maintained in a sanitary condition, and which eliminates the danger of spoiling the food being cooked in the kettle by burning or scorching the same.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawings by the same reference characters.

Figure 1:
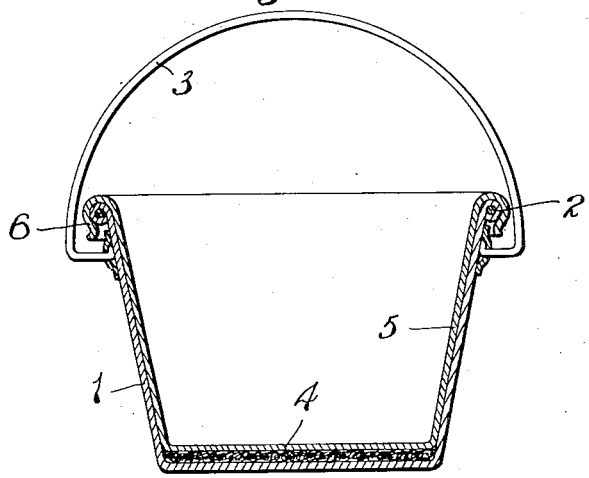
Figure 1 is a vertical sectional view through a cooking utensil constructed in accordance with the invention.
Figure 2:
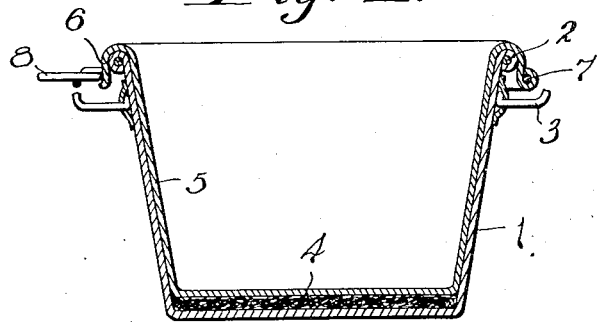
Fig. 2 is a similar view showing a modification of the invention.

Referring to the drawings, the numeral 1 designates the outer casing of the kettle which comes in direct contact with the flame of the fire. This outer casing can be conveniently stamped from sheet metal of a suitable gage, and is shown as provided at its upper edge with an exterior rib 2. If desired, the conventional handle 3 may be applied to the outer casing 1 for convenience in moving the kettle from place to place. A layer 4 of asbestos or similar material is fitted upon the bottom of the outer casing 1, and an inner casing or lining 5 is nested within the outer casing 1, fitting tightly within the same so as to press the asbestos sheet 4 firmly against the outer casing. This lining 5 may be held in position in any suitable manner, being shown in the present instance as having a returned lip 6 at the upper edge thereof. This returned lip or flange 6 is resilient and is adapted to spring over the exterior rib 2 of the outer casing 1 when the lining 5 is forced into position within the outer casing. With this construction it will be obvious that the lining can be forcibly inserted in position or removed therefrom, thereby enabling the parts to be easily assembled or taken apart, and enabling the kettle to be maintained in a sanitary condition without difficulty.

Figure 3:
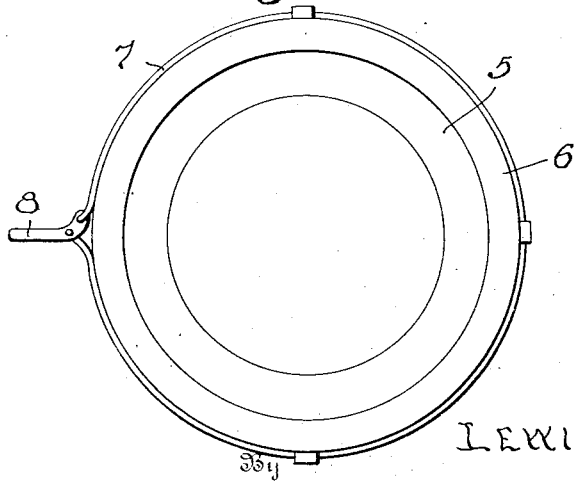
Fig. 3 is a top plan view of the device shown by Fig. 2.

A slight modification is shown by Fig. 3, in which a fine wire 7 is applied to the edge of the returned flange 6, the ends of the wire being connected by a small finger lever 8 so that by swinging the lever into locking position the ends of the wire are forcibly drawn toward each other to contract the returned flange 6 and force the same into a firm engagement with the top of the outer casing 1. The asbestos layer 4 which is interposed between the outer casing 1 and the lining 5 operates in an effective manner to prevent the burning or scorching of any food being cooked within the kettle.

Having thus described the invention, what I claim as new and desire to secure by Letters Patent, is:—

1. A cooking kettle including an upwardly flared outer sheet metal casing having an exterior rib at the upper edge thereof, a layer of non-heat conducting material arranged upon the bottom of this outer casing, and a correspondingly flared sheet metal lining nested closely within the outer casing and extending approximately the full depth thereof so as to force the non-heat conducting layer tightly against the bottom of the outer casing, the upper edge of the lining being provided with an outwardly returned resilient lip which has a spring action and is adapted to snap over the rib of the outer casing to lock the lining removably in position.

2. A cooking utensil including an outer sheet metal casing having a rib at the upper edge thereof, a layer of non-heat conducting material fitted upon the bottom of the outer casing, a sheet metal lining nested closely within the outer casing so as to force the non-heat conducting layer against the same, the upper edge of the lining being returned to fit around the edge of the outer casing, a wire applied to the said returned edge of the lining, and means for drawing the ends of the wire together to force the returned edge of the lining into engagement with the rib of the outer casing.

In testimony whereof I have signed my name to this specification in the presence of two subscribing witnesses.

LEWIS C. BROWN.

Witnesses:
EARL D. GEHRET,
ALLEN W. BERGER.